(12) United States Patent
Kasten

(10) Patent No.: US 8,740,683 B2
(45) Date of Patent: Jun. 3, 2014

(54) SYSTEM AND METHOD FOR USING DRAFT POSITION INFORMATION TO AID PLAYER SELECTION IN A FANTASY LEAGUE DRAFT

(75) Inventor: Theodore Kasten, Chicago, IL (US)

(73) Assignee: Advanced Sports Media, LLC, Chicago, IL (US)

( * ) Notice: Subject to any disclaimer, the term of this patent is extended or adjusted under 35 U.S.C. 154(b) by 849 days.

(21) Appl. No.: 12/574,654

(22) Filed: Oct. 6, 2009

(65) Prior Publication Data

US 2010/0093415 A1 Apr. 15, 2010

Related U.S. Application Data

(63) Continuation of application No. 11/456,181, filed on Jul. 7, 2006, now Pat. No. 7,618,312, which is a continuation-in-part of application No. 10/835,952, filed on Apr. 30, 2004, now Pat. No. 8,099,182.

(51) Int. Cl.
*A63F 9/00* (2006.01)

(52) U.S. Cl.
USPC .................................................. 463/7

(58) Field of Classification Search
None
See application file for complete search history.

(56) References Cited

U.S. PATENT DOCUMENTS

| | | | |
|---|---|---|---|
| 4,918,603 A * | 4/1990 | Hughes et al. | 463/4 |
| 5,263,723 A | 11/1993 | Pearson et al. | |
| 5,846,132 A | 12/1998 | Junkin | |
| 5,971,854 A * | 10/1999 | Pearson et al. | 463/41 |
| 6,112,128 A | 8/2000 | Steinmetz | |
| 6,260,019 B1 * | 7/2001 | Courts | 705/7.31 |
| 6,371,855 B1 * | 4/2002 | Gavriloff | 463/42 |
| 6,510,419 B1 | 1/2003 | Gatto | |
| 6,616,529 B1 | 9/2003 | Qian et al. | |
| 6,669,565 B2 | 12/2003 | Liegey | |
| 6,688,978 B1 | 2/2004 | Herman | |
| 7,001,279 B1 | 2/2006 | Barber et al. | |
| 7,303,472 B2 | 12/2007 | Guagliardo | |
| 7,458,093 B2 | 11/2008 | Dukes et al. | |
| 7,614,944 B1 | 11/2009 | Hughes et al. | |
| 7,618,312 B1 | 11/2009 | Kasten | |
| 7,699,707 B2 * | 4/2010 | Bahou | 463/42 |
| 7,736,219 B2 | 6/2010 | Gottlieb | |
| 7,762,878 B2 | 7/2010 | Nicholas et al. | |
| 8,028,315 B1 * | 9/2011 | Barber | 725/47 |
| 8,105,159 B2 | 1/2012 | Wojewoda et al. | |
| 8,192,260 B2 | 6/2012 | Fleming | |
| 2003/0203757 A1 | 10/2003 | Chanda et al. | |
| 2004/0110552 A1 * | 6/2004 | Del Prado | 463/4 |
| 2004/0266530 A1 * | 12/2004 | Bishop | 463/42 |

(Continued)

OTHER PUBLICATIONS

Detroit Tigers #30 Magglio Ordonez Stats <URL:http://sports.espn.go.com/mlb/players/stats?playerid=3728>.
Jul. 2006 Rockets Regular Statistics <URL: http://www.nba.com/rockets/stats/2006/index.html>.
San Diego Chargers #56 Shawne Merriman <URL:http://sports.

(Continued)

*Primary Examiner* — Seng H Lim
(74) *Attorney, Agent, or Firm* — Mahamedi Paradice Kreisman LLP

(57) ABSTRACT

In a fantasy league draft, prior to a user-participant making a player selection at a given draft position, a programmatic determination is made as to a likelihood that a particular player will be available for selection in one or more subsequent draft positions. The draft positions may be ones assigned to a particular user-participant, or any draft position a user-participant wants to consider. In one embodiment, the determination is then communicated to the user-participant prior to the user-participant making the payer selection in the given draft position.

20 Claims, 11 Drawing Sheets

(56) References Cited

U.S. PATENT DOCUMENTS

| | | | |
|---|---|---|---|
| 2004/0266535 A1 | 12/2004 | Reeves | |
| 2005/0001837 A1 | 1/2005 | Shannon | |
| 2005/0021352 A1 | 1/2005 | Maierhofer et al. | |
| 2005/0064937 A1 | 3/2005 | Ballman | |
| 2005/0159220 A1 | 7/2005 | Wilson et al. | |
| 2005/0164792 A1* | 7/2005 | Wilcock | 463/42 |
| 2005/0209717 A1 | 9/2005 | Flint et al. | |
| 2005/0239549 A1* | 10/2005 | Salvatore et al. | 463/42 |
| 2006/0040719 A1 | 2/2006 | Plimi | |
| 2006/0105827 A1 | 5/2006 | Metzger et al. | |
| 2006/0183548 A1* | 8/2006 | Morris et al. | 463/42 |
| 2006/0217198 A1 | 9/2006 | Johnson | |
| 2007/0021165 A1 | 1/2007 | Ma et al. | |
| 2007/0022029 A1 | 1/2007 | Ma et al. | |
| 2007/0072679 A1 | 3/2007 | Kerns et al. | |
| 2007/0185599 A1 | 8/2007 | Robinson et al. | |
| 2007/0203591 A1 | 8/2007 | Bowerman | |
| 2007/0232393 A1 | 10/2007 | Dreyer | |
| 2008/0125228 A1 | 5/2008 | Ware et al. | |
| 2008/0281444 A1* | 11/2008 | Krieger et al. | 700/91 |
| 2009/0045581 A1 | 2/2009 | Cornelio | |
| 2009/0270172 A1 | 10/2009 | Sorrells et al. | |
| 2010/0075729 A1 | 3/2010 | Allen et al. | |

OTHER PUBLICATIONS espn.go.com/nfJ/players/stats?playerId=8427>.

Real Madrid Statistics Aug. 2007 <URL: http://soccernet.espn.go.com/team/stats?id=86&cc=5901>.

The List: 10 greatest NFL records <URL: http://espn.go.com/page2/s/lisUnfl/bestrecords.html>.

Madden NFL 2002 Review <URL: http://ps2.ign.com/articles/166/166228p1.html>.

Madden NFL 2002 FAQ and Strategy Guide for Playstation 2 <URL:http://www.gamefaqs.com/console/ps2/file/478096/17500>.

Sport Planet Madden NFL 2002 Pic <URL:http://www.sportplanet.com/features/screenshots/madden2002/ps2/image_tw.asp?num=61&cur=4>.

FIFA Soccer 2002. •<URL: http://cube.ign.com/articles/166/166416p1.html>.

FIFA Soccer 2002 Complete FAQ for Nintendo Gamecube <URL:http://www.gamefaqs.com/console/gamecube/file/529421/16393>.

Fantasy Sports Stadium, Auto Draft Strategy Guide: 2004 Fantasy Football Draft. [dated Aug. 11, 2004], 6 Pages.

Basketball-Reference.com, "Calculating PER", 2004-2005. 3 pages.

Hurtt, Rob. "Ultimate fantasy source: football." The Sporting News, 227, 36, 62 (1), Sep. 8, 2003.

* cited by examiner

1010

Recommended Picks

| Early | ADP | Late | Name | Pos | Team | Bye | Value | D |
|---|---|---|---|---|---|---|---|---|
| 1 | 2 | 2 | LaDainian Tomlinson | RB | SD | 10 | 317 | 1 |
| 1 | 1 | 2 | Priest Holmes | RB | KC | 5 | 292 | 8 |
| 3 | 4 | 6 | Deuce McAllister | RB | NO | 10 | 263 | 5 |
| 3 | 4 | 5 | Ahman Green | RB | GB | 6 | 255 | 4 |
| 3 | 6 | 8 | Clinton Portis | RB | WAS | 3 | 245 | 3 |
| 3 | 5 | 8 | Shaun Alexander | RB | SEA | 8 | 213 | 1 |

| Pos | This Round | Players Taken | Next Round | Lost Value |
|-----|------------|---------------|------------|------------|
| WR  | 186        | 4             | 172        | 14         |
| TE  | 135        | 1             | 127        | 8          |
| RB  | 126        | 1             | 120        | 6          |
| QB  | 266        | 1             | 263        | 3          |
| DP  | 257        | 0             | 257        | 0          |

Refresh Dynamic Values

FIG. 10B

SYSTEM AND METHOD FOR USING DRAFT POSITION INFORMATION TO AID PLAYER SELECTION IN A FANTASY LEAGUE DRAFT

RELATED APPLICATIONS

This application is a continuation of U.S. patent application Ser. No. 11/456,181 entitled "System and Method For Using Draft Position Information To Aid Player Selection In A Fantasy League Draft," filed on Jul. 7, 2006 now U.S. Pat. No. 7,618,312, which is a continuation-in-part of U.S. patent application Ser. No. 10/835,952, entitled "System and Method for Facilitating Analysis of Game Simulation of Spectator Sports Leagues," filed on Apr. 30, 2004 now U.S. Pat. No. 8,099,182, and naming Theodore Kasten as sole inventor. The aforementioned priority applications are hereby incorporated by reference in their entirety.

TECHNICAL FIELD

The disclosed embodiments relate generally to the field of game simulations of spectator sports. In particular, the disclosed embodiments relate to a system and method for facilitating game simulation of a spectator sport.

BACKGROUND

Spectator sports, such as professional or collegiate football, baseball, basketball, and hockey, rely on fan participation to generate revenue and enthusiasm. Over the years, fan participation and enthusiasm has driven spectator sports to become highly lucrative. As a result, numerous secondary businesses and events have been fostered and created based on the ever increasing popularity of the spectator sport.

Fantasy leagues, in particular, are an increasingly popular and sophisticated derivative of spectator sports. Currently, fantasy leagues for football, baseball, basketball and hockey are readily available. The emergence of the Internet and online environment has in particular fostered the growth behind the fantasy leagues.

In general, a fantasy league simulates, or at least corresponds, to events of a particular sports league. Fantasy football leagues, for example, have members that form fantasy teams. Each fantasy team may have designated positions corresponding to what an actual sports team has. For example, a fantasy football team may have all the offensive, defensive and special team positions of an actual professional football team. The members of a fantasy league go through a selection process where each makes a selection of a particular player for his team. A member of a fantasy football league can fill the positions of his fantasy team by assigning a particular position or role on his team to a named football player. The team that the named player plays on in the actual sports league is not relevant in the fantasy team. But the statistics the named player acquires in the course of a season are converted into fantasy numbers. The member's fantasy team is then ranked against other fantasy teams by an aggregate or total value reflecting the fantasy numbers of all positions or slots in the fantasy team, where each such fantasy number is derived from the performance of a corresponding player in the actual sports league. The fantasy number that is determined for a player is usually statistical in nature, reflecting both positive statistics (scoring a touchdown, throwing a completed pass, running yardage) and negative statistics (fumble, interception, incomplete pass) of the player's performance in the season.

Fantasy numbers may be formulated based on a particular player's position. For example, a quarterback fantasy number may use pass attempts, completion ration, touchdown passes, and turnovers as statistical input in deriving an overall fantasy number. In contrast, a fantasy number for a cornerback may be based on the number of interceptions and tackles that the particular cornerback player had in the course of a season.

Fantasy league services, particularly those that operate on the Internet, sometimes provide some predictive valuation of a player for purpose of guiding members of the fantasy league to select players. For example, a fantasy league service may list a number of quarterbacks in the NFL along with a fantasy number. The fantasy number may be based on that player's past performance, particularly in respect to how that player's past performance has been valued in terms of that league's point scoring system. A participant or member of a fantasy league may also subscribe to third party services, review fantasy sports magazines, or other sources of information to obtain statistical information for predicting the value of a particular player to his fantasy team. Other services may quantify statistics in terms of one or more predictive value numbers in order to guide their users in selecting players for their fantasy teams. Current methodologies to evaluate players based on historical statistics are described in more detail below.

There are different types of fantasy leagues, each with different sets of rules. In general, the rules of the fantasy leagues may be based on the amount of participation the user of the service is expected to have with the fantasy teams. Some fantasy leagues are for casual users, while others are for more sophisticated users who spend considerable more time developing strategy and data. But in most cases, fantasy leagues have two stages: (1) player selection, and (2) team management.

In player selection, the members of the fantasy league make player selections based on predictions of which players are best suited for their team. A player from a sporting team is typically only assigned to one fantasy team, so a league member will not get every player he wants. Rather, league members may be required to rank players and have the service assign players to each member. Alternatively, a live or simulated draft may be conducted in which each league member makes a selection in a designated draft order. In either case, the fantasy league members must make some decisions on what players to select and when. For example, the member may make a player selection based on what he hopes that player will produce in terms of fantasy points, and what players other members in the league are expected to select for their respective fantasy teams. Current methodologies to assist users in making draft decisions are described below.

After player selection, the members manage their teams. Many fantasy sports services let members trade players, release players, and acquire new players as free agents. However, certain league-dependent rules may apply to these player transactions. For example, the number of trades a member may make may be limited in a season. The number of acquisitions may also be constrained by team size. Members may make management decisions based on the performance of their fantasy teams. For example, players performing poorly in terms of points may be released and replaced. A member may prefer another player, in which case a trade may be worked out amongst two members in a league. Again, the particular transactions that can be done with a particular fantasy service depend on the rules of that fantasy service.

Fantasy leagues may include play-off and championship rounds, but these rounds may not be based on playoff or championship events in the actual sports league. For example, some fantasy football leagues designate the first 12 weeks of the NFL season the regular season, designate weeks 13-16 of the NFL's regular season the playoffs, and ignore week 17, when many meaningless games are played. Many fantasy leagues end with week 16, because the subsequent playoff season only involves a fraction of the players in the NFL.

Existing Player Valuation Methods

There are two basic metrics that are normally used to determine a value assigned to a player for purpose of predicting that player's value in a fantasy league. These metrics include performance categories and a fantasy league point system. Performance categories include statistical quantities of a player's past performances. For example, the performance of individual offensive and defensive players are tracked in multiple categories (i.e. Touchdowns, Yardage Gained, Receptions, Interceptions, Field Goals) and aggregated over an entire season. Defensive teams as a whole are also tracked in multiple categories (i.e. Touchdowns Against, Yardage Against, Interceptions, Sacks) and aggregated over an entire season. Each individual fantasy sports league sets a specific point value for each performance category (i.e. 6 points for a Touchdown, 1 point for 20 yards gained, 2 points for a reception, 5 points for a Field Goal over 50 yards). These two metrics are combined (e.g. multiplied together and summed) to compute an individual players or teams total estimated fantasy point value.

Existing Draft Methods

There are currently two methodologies used during a fantasy sports draft to help users make decisions on what players to select. The first methodology, Value Based Drafting ("VBD"), is the most prominent. The second methodology, Dynamic Value Based Drafting ("DVBD"), is a more advanced version of VBD but is not widely used because of the complexity of the calculations. VBD provides a relative value of players in comparison to each other based on a fantasy point value metric before the draft starts.

VBD is used to determine which players are the most highly valued relative to other players at the same position. To determine which player will provide the most relative value, VBD subtracts from all players at a position the value of the last starting player at that position based on player rankings (i.e. if there are 10 participants in a league that each have to start 2 Running Backs, then the point value of the $20^{th}$ most highly ranked Running Back will be subtracted from the point value of all other players). This provides a relative value of all players available in a draft as compared to the worst starting player at their same position.

DVBD uses VBD as its basis and also takes into account changes in the supply of players at each position as the players are drafted. The advantage that DVBD provides over VBD is in calculating the relative values of players still available as a draft progresses. Instead of using the arbitrary value of the last starting player at each position as a baseline, DVBD uses the value of the players likely to be available for the participants' next draft pick. This value is more pertinent as users typically compare consecutive draft picks with each other more often than they compare their current draft pick with the last pick of the draft. This value will change as players are selected and as the draft progresses.

BRIEF DESCRIPTION OF THE DRAWINGS

FIG. 10A and FIG. 10B provide different implementations of how draft position information may be presented to a user, under one or more embodiments of the invention In the drawings, the same reference numbers identify identical or substantially similar elements or acts. To easily identify the discussion of any particular element or act, the most significant digit or digits in a reference number refer to the Figure number in which that element is first introduced. Any modifications necessary to the Figures can be readily made by one skilled in the relevant art based on the detailed description provided herein.

DETAILED DESCRIPTION

General Overview and Terminology

Figure 1:
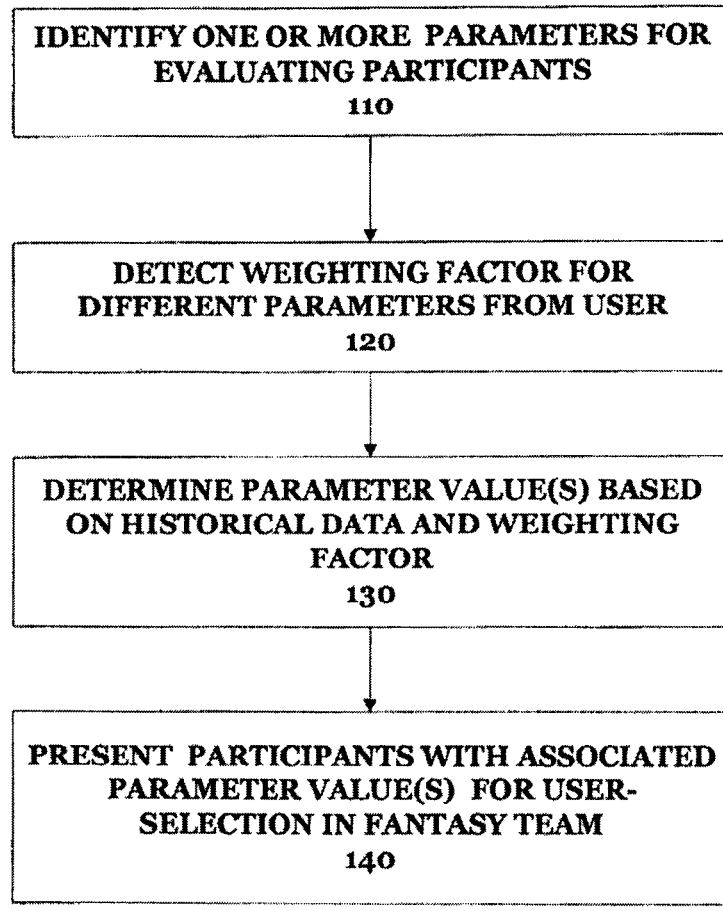
FIG. 1 illustrates a methodology for enabling a user of a game simulation to formulate a predictive valuation of one or more players in a sports league, according to an embodiment.

Embodiments of the invention provide a system, method, and tool to evaluate and analyze players from real-life sports leagues for purpose of selecting players for use in fantasy teams and other game simulations.

An embodiment described herein facilitates a game simulation of a series of sporting events that occur over a duration of time. In one embodiment, a plurality of parameters are associated with individual players in a series of sporting events. An input may be detected from a user of the game simulation. The input may indicate a preference of the user for how one or more of the plurality of parameters are to be valued in relation to one another. An overall value for one or more participants in the game simulation may be indicated, where the overall value corresponds to a value of the plurality of parameters and to the input.

The following acronyms may refer to the following: NFL (NATIONAL FOOTBALL LEAGUE), NBA (NATIONAL BASKETBALL ASSOCIATION), NHL (NATIONAL HOCKEY LEAGUE), MBL (MAJOR LEAGUE BASEBALL), MAJOR LEAGUE SOCCER (MLS), and NASCAR (NATIONAL ASSOCIATION FOR STOCK CAR AUTO RACING).

The expression "series of sporting events" may refer to a planned series of contests for a particular sports league or organization. In the NFL, for example, a regular season (excluding a playoff season or an exhibition season) includes 16 games played over a period of 17 weeks.

A "game simulation" of a sporting event series refers to any recreational and predictive analysis of an aspect of a sporting event series. Examples of game simulations include fantasy leagues for season of the NFL, the NBA, or MBL. A specific aspect of a sporting event series may include a particular player in the sporting event. For example, the player may be a football Quarterback or Running Back in the NFL.

A player or participant in a sports league may include a football player (NFL), a basketball player (NBA), a baseball player (MBL), or a hockey player (NHL). The concept of a player or participant may be extended to a team and not just to an individual. In the context of auto racing, the participant may include a driver, a driving team, and/or a set of racing cars that belong to one team or are associated with one another (e.g. "Team Porsche").

The expression "strength of schedule" means, for a given participant, a determination of a competence level of one or more opposing participants and/or opposing participant teams. Various methodologies may be used to determine the competence level of the opposition, some of which are described in more detail below. The opposition may be considered individually or in aggregate. In football, for example, the participant's team may have a strong strength of schedule rating if the participant's team plays more than its share of winning teams.

As used herein, the term "simulation" means a statistical simulation, or a simulation that is based at least in part on a statistical simulation.

In an embodiment, a system, method, technique or tool is provided to facilitate analysis of a game simulation of a series of sporting events that are to occur in an upcoming season. For example, the game simulation may be a fantasy league for an upcoming season of a professional sports league. An embodiment provides that a plurality of parameters are associated to each of a plurality of participants in the series of sporting events. The plurality of parameters may include at least a performance-based parameter and a non-performance-based parameter. A user-specific input from a user of the game simulation may be detected. The input may indicate how one or more of the plurality of parameters, including the non-performance-based parameter, are to be valued in relation to one another. An overall value may be indicated for one or more participants in the game simulation that is to a value of the plurality of parameters and the input.

The performance parameters may correspond to metrics that represent a quantity (such as a statistic) that is based on achievement of a player's performance. For example, in football leagues such as the NFL, performance parameters may correspond to metrics such as number of touchdowns scored, how many passes were caught or completed, how many yards were rushed, number of fumbles lost etc. The performance parameters may also be based on a combination of two or more performance parameters, such as the Quarter Back Rating. A non-performance parameter may correspond to a measure (such as a likelihood) that may affect a given player's performance. Examples of non-performance parameters include strength of opponents scheduled (such as strength of opponent's defense for offensive players, and strength of opponents offense for defensive players); consistence, and durability. Consistency and durability may be based on historical data. Consistency may, for example, measure deviation amongst performance parameters from game to game in past performances of a player, while durability measures the number of times a player has been injured, or for how long etc. Other examples of non-performance parameters include measurements for weather or environmental impact. A specify type of non-performance parameters described in detail below are dynamic player value parameters.

According to another embodiment, a predictive value may be determined for a given player in a sports league. The predictive value may be based on one or more individual games that the given player is scheduled to play or otherwise perform in. The predictive value may be based at least partially on an analysis of the given player playing in each of the one or more individual games. An overall value of the given player may be indicated using the predictive value of that player for the individual games.

According to other embodiments described herein, players of a spectator sports league may be evaluated for a draft in a fantasy league. In one embodiment, an overall value of a player of the sporting league is determined based at least in part on a past performance of the player. A given participant of the fantasy league may be indicated an adjustment to the overall value of a particular player in relation to other players in the sporting league based on another player that the given participant has already selected for the given participant's fantasy team. In another embodiment, a comparison may be maintained for individual players of the sports league, where the comparison indicates a difference in the value of that player with respect to some reference value. The reference value may be another player.

Currently, fantasy football (based on the NFL) is the most popular form of game simulation. For this reason, some examples of embodiments provided in the specification are explained in the context of football. However, embodiments described herein may be equally applicable to other sports, including baseball, basketball, hockey, soccer, golf, cricket, auto racing, bowling, horse racing, tennis, poker and chess. Furthermore, embodiments described herein may apply to any league or organization in which sports or played and statistics are maintained, including non-professional sporting events such as collegiate sports or Olympic events.

Embodiments described herein may be implemented as a computer-implemented method. The term "computer-implemented method" refers a method that has at least some, but not necessarily all of its steps performed through execution of instructions by one or more processors. Individual steps of a computer-implemented method may be performed programmatically, meaning a given step may be performed automatically through the execution of programming code or logic.

Embodiments of the invention may also be implemented over a network, such as in conjunction with a network service that operates a game simulation such as a fantasy league.

In addition, embodiments of the invention may be implemented through use of modules that communicate to users through use of a network. For example, an embodiment may be implemented as an integrated, additional or supplemental service with a network operated fantasy league, such as provided on the YAHOO! Network or CBS SPORTSLINE. Alternatively, an embodiment may be implemented as a stand-alone application which a user of a fantasy league or other game simulation may use to enhance his performance. In one implementation, one or more module may be used to evaluate players for a game simulation, and to enable users of the game simulation to make draft picks. As used herein, a module includes a program, a subroutine, a portion of a program, a software, firmware or hardware component that is capable of performing a set of tasks or functions. A module can exist on a hardware component, such as a server or client, independently of other modules. Alternatively, a module can exist with other modules on the same server or client, or even within the same program.

Player Valuation

One application for an embodiment is a system or tool for use with a fantasy sports league, such as a fantasy football league for the NFL, or a fantasy baseball league for the MBL. In the context of such simulations, embodiments described herein enable a user participating in the simulation to make more informed and/or strategic decisions regarding player/participant selection and team management.

A general format for a fantasy league includes (1) a team formation stage that gives a user an opportunity to make his player selections for his fantasy team, and (2) a team management phase where a user can view the performance of his fantasy team and make certain management decisions based on the results. The particular management decisions that are allowed are based on the particular rules of the fantasy league. The fantasy team may have designated positions similar to the sporting event that it simulates. Players are designated to positions in a given fantasy team irrespective of their actual team assignment in the sports league. It is typical for a fantasy football team, for example, to have a quarterback from one NFL team, and a Running Back from another NFL team. The exact number of positions, including backup positions that are to be assigned to a fantasy team are determined by the rules of the particular fantasy league.

A fantasy league normally consists of a set number of fantasy teams. Each of the fantasy teams may be controlled by a user (sometimes referred to as "team owner"). Generally, the number of teams that can participate in a league are set by the rules of the fantasy league. For example, many leagues set the number of teams per league at 8, 10, 12 or 20. Typically, at the start of a league, all the teams are empty. A draft or player/participant selection stage is performed, where fantasy team owners make player selections that result in the fantasy teams being populated. There are different draft rules that can be used to govern the draft order amongst the team owners during a player draft. A simple fantasy league may have users prioritize their list of players, and then randomly distribute players from the real sports league based on user-selections. When two or more users select the same player, a process makes the decision on which user receives the player based on factors such as a user's priority for that player and randomness. A more sophisticated fantasy league may have a live or simulated draft, where each user's take turns making draft selections. In this scenario, the draft selections are made from an available pool of players. The order in which the first round and subsequent rounds of the draft are conducted are important to the users, as the draft order is what determines the user's ability to select a particular player.

Embodiments of the invention enable a participant of the game simulation to evaluate real-life players/participants from a spectator sports league for purpose of assigning select players to his fantasy team. When players are selected for the fantasy team, statistical values corresponding to the performance of that player in the sports league are valued in the fantasy team. The performance of the fantasy team is based on the statistical performance of the real-life players in the sports league. An embodiment described herein facilitates the fantasy league user in evaluating players of the sports league using, at least in part, a sophisticated statistical analysis of various factors relating to the player's past performance. These factors assist in predicting a particular player's success on the fantasy team. Through use of embodiments described herein, a player may use strategic considerations to assign his own configuration, weighting or valuation of the various parameters that comprise the player valuation. In addition, events in the sporting event series, such as the passing of a week in the NFL season, may be used to update the parameters of the player valuation on an ongoing basis.

According to another embodiment, a system is provided to assist a user in making draft picks during the team formation stage of a fantasy league. A system such as described takes into account factors such as (i) what draft picks the user will have (given a particular draft order, rounds, and picks per round), (ii) how selection of a particular player will compare to another user's selection of another player, (iii) scheduling conflicts and issues that may affect a player's value to a user, and (iv) ramifications of a user passing on a particular player in a round in view of the user's subsequent order of picks.

FIG. 1 illustrates a methodology for enabling a user of a game simulation to formulate a predictive valuation of one or more players in a sports league. The predictive valuation is a measure of how a particular player is expected to do in terms of fantasy points. The player valuation may be utilized to facilitate a decision in a player selection stage of the fantasy league. Alternatively, the player selection may be used during the team management stage to facilitate a decision on what player should be selected as a replacement, or made the basis of a trade. For example, in some fantasy football leagues, a user may make a "free agent" acquisition from a pool of available players in order to replace an injured player. A tool or system described under an embodiment enables the user to make a decision of what player in the free agent pool is best for him, based on statistic analysis that is configured to the user's particular strategic considerations.

For illustrative purposes, embodiments described herein make reference to a fantasy league as a particular example of a game simulation. Because of its overwhelming popularity, examples emphasize fantasy football leagues, but it should be apparent that embodiments and examples described below are equally applicable to other sports and sports leagues, as well as to other forms of game simulations for such sports.

According to a method such as shown by FIG. 1, a step 110 provides that one or more parameters for evaluating players in a spectator sports league (or other organization or forum) are defined. The parameters may be selected based on known information about the sports league that is simulated, including, for example, statistical quantities that indicate a player's value, competence, or skill level. The parameters may be defined by anyone or all of the following: (i) a host or service that provides or otherwise operates the game simulation, (ii) a third-party service that operates with a particular game simulation to provide the analysis described herein, (iii) inherently, within a tool that operates on processing resource to compile statistics and other information for a game simulation (see e.g. player valuation module 710), and (iv) by the user, on the fly and/or in a predetermined fashion.

Fantasy leagues, for example, operate at different levels of sophistication. An average level of user-participation in an advanced fantasy league may be much greater than that of a more casual league. Specifically, the parameter definitions for an advanced fantasy league may be more sophisticated, numerous and/or involved than the parameter definitions of a more casual fantasy league.

One type of parameter that can be identified is a performance parameter. A performance parameter may correspond to any statistical or quantitative category of a player's past performance. For example, in the sport of football, each position may have different parameters. For Quarterback, the parameters may include passing yardage, completion rate, the number of interceptions thrown, and the number of touchdown passes thrown. For a Running Back, the parameters may include rushing yardage, number of attempts, the number of passes caught, passing yardage, number of touchdowns scored, and the number of fumbles. In the sport of baseball, the parameters may correspond to batting average, home runs, extra base hits (doubles, triples), walks, strikeouts, and errors. For pitchers, the performance parameters may include number of wins, number of losses, the pitcher's earned run average, the number of strikeouts, the number of innings pitched, the number of saves, and the number of blown saves. In basketball, the parameters may correspond to points scored, shooting percentage, assists, rebounds (both offensive and defensive), turnovers, free throw percentage, and three-point percentage. For the sport of hockey, the performance parameters may include goals scored, shots on goal, and penalty minutes. In golf, the previous scores of a particular golfer may be calculated. In auto-racing, vehicle speed and lap times of previous races may be used for performance parameters. The aforementioned are just a small sample of all the performance parameters that can be defined to describe the performance level, skill level, or past results of participants in sports leagues and organizations. Types of statistical categories and definitions that are considered under embodiments of the invention are provided in various publications, including for example: *Official* 2003 *National Football League Record & Fact Book* (*Official National Football League Record and Fact Book*), and the *Sports Illustrated* 2004 *Almanac; Tuff Stuff's Fantasy Football Guide* (2003 edition), and *RotoWorld.com's Baseball Reference Guide* (2004 edition). All of the aforementioned publications are hereby incorporated by reference in their entirety for purpose of their respective teachings in the definition and use of statistical and quantitative parameters (batting average, rushing yards) of professional and other spectator sports leagues.

In addition to performance parameters, an embodiment provides for identification and use of parameters that consider player values for an upcoming season on a game-by-game basis. This type of parameter is termed a dynamic player value parameter. This class of parameters builds on the current player valuation methodology by adding metrics that more accurately predict the true week-to-week value of a player to a fantasy sports team. These metrics enable users to account for the dramatic variation in performance over an entire season. For example, upcoming scheduled games of a team in a real-life sports league may be analyzed for attributes or factors that indicate a likelihood that a player's valuation will be more accurately reflected by a consideration of individual games in a player's schedule, rather than a predictive evaluation of how a player will perform over an entire season. In this way, a dynamic player value parameter may be predictive of a player's value to a fantasy team based on a game-by-game analysis of that player's schedule.

One example of a class of dynamic player value parameters is a parameter that quantifies a strength of opponent's defenses to a particular player. Such a parameter can be valued to predictively quantify the strength of individual opponent's defenses for each player's team in a given segment of the season. This parameter may be used to evaluate an offensive player, such as a Running Back or Quarterback. Another example of this type of parameter is a strength of opponents' offense, which predictively quantifies the strength of individual opponent's defenses for each player's team in a given segment of the season. This parameter may be useful in evaluating a defensive player, such as a linebacker or safety. Both of these examples are described in greater detail below. Numerous other examples exist in addition to the examples provided above. In the sport of baseball, a strength of opponent's pitching for scheduled games may be used to evaluate how likely a player will do batting in a given stretch of games. In order to evaluate pitches, parameters that evaluate how well that pitcher's opponents hit or how often they strikeout may be used.

Step 120 provides that a weighting factor for the different parameters is detected or otherwise determined for a user of the fantasy league. The weighting factor may be determined in anyone of a variety of ways. In one embodiment, the weighting factor may be determined directly via a user-input. For example, the user may specify anyone of the following when determining the fantasy player value of an offensive player: (i) maximize the weighting of a parameter value corresponding to the strength of opponent's defenses; (ii) minimize the weighting or ignore the parameter value corresponding to the strength of opponent's defenses; (iii) formulate the weighting so that it is a bonus or penalty for the player based on the value of the parameter. In addition, the weighting may be varied. For example, some parameters may be given more weight by the user for purpose of selecting players via the draft, while other parameters are given more weight when selecting players via free agency.

The weight factor may also be determined indirectly. For example, the user may submit one or more profile items, which can then be determined and correlated to a particular profile for the user of the game simulation. As another example, the user may be profiled as a risk-taker, in which case the weighting may be biased towards favoring high-risk/high yield parameters. Alternatively, the profile items may be determined for the user based on the user's behavior. For example, the user may be classified or profiled by age group or behavior, such as in the context of online activity.

In step 130, a set of player values are determined for individual players in the sports league. The set of player values may correspond to one metric that combines the values of the different defined parameters with the user-specific weighting factors. Alternatively, the set of player values may be multi-dimensional, in that multiple metrics about a particular player are separately presented to the user.

In step 140, users are presented with associated sets of parameter values for selection of their fantasy team. The sets of parameter values may be displayed, or otherwise communicated to the user in order to facilitate that user in making a player selection. The manner in which player selections are subsequently made depend on the rules of the simulation.

Figure 2:
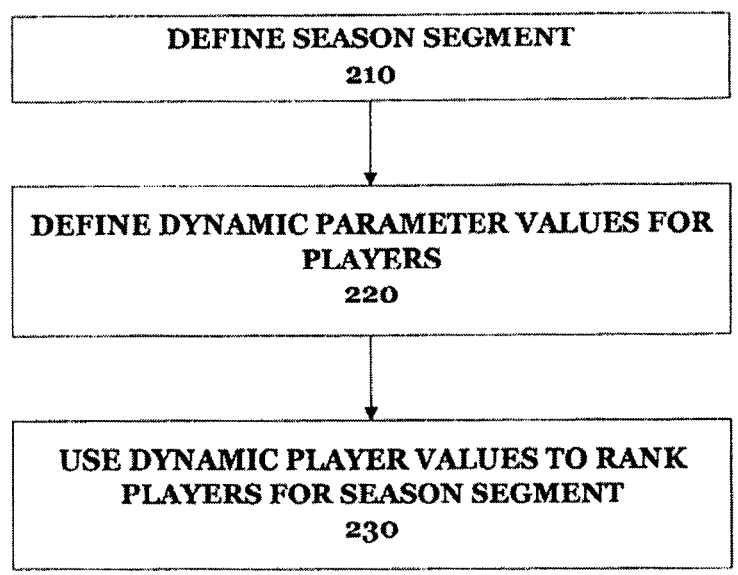
FIG. 2 illustrates a method in which dynamic player value parameters may be used to as part of an overall strategy for a fantasy league, according to an embodiment.

FIG. 2 illustrates a method in which dynamic player value parameters may be used as part of an overall strategy for a fantasy league. An embodiment such as described may enable participants to evaluate players differently for certain games or portions of the season for the sports league. Users of a fantasy league may seek to benefit by using a strategy that is skewed to account for seasonal or game performances of certain players. For example, an embodiment such as described facilitates analysis of players for game simulations that run for individual games, or portions of the seasons. Alternatively, an embodiment as described in FIG. 2 enables the user of the game simulation to strategize player acquisition and management decisions based on specific games or time periods in the season. For example, players that tend to start strong and taper may be identified and selected for trade value during the player acquisition trade, for purpose of being able to trade that player once the season progresses.

Step 210 provides that a portion of the season for the sports league is designated. The portion of the season may correspond to a specific game, a specific set of games, or a portion of the season for the sports league. A fantasy football league, for example, may operate in five game sets over the course of a 17 week football season. Alternatively, a user of a fantasy league may decide to look for players that are most valuable at the beginning of the season, or at the end of the season. Thus, the designation of the season portion may be set by a duration of the fantasy league, or by strategic considerations of the user.

In step 220, dynamic player value parameters are defined that, for a given player, provide a player value that is based at least in part on a value of a performance parameter that is more indicative of the value of the given player for the season portion, as opposed to the entire season. For example, the performance parameter value may predict an overall player value to be disproportionately impacted by the particular season segment than the season in aggregate.

In step 230, a player valuation for the portion of the season is presented for a particular user based at least in part on the parameters defined in step 220. For example, players may be ranked for a particular segment of the season, such as the very beginning or very end of the season. Alternatively, different users may be provided different valuations, even for the same set of players, based on weighting input provided by those users.

Dynamic Player Valuation Examples

The following are examples of dynamic player value parameters, such as described and/or used with embodiments of FIGS. 1 and 2. In an embodiment, the dynamic player values may be used to determine a value of a particular player to a fantasy league based on a predictive game-by-game analyses of the upcoming season for that player.

A durability parameter may be defined to correlate to a player's durability. A value for a durability parameter may predict or indicate the likelihood that a player will miss games in a season due to injury. Injuries to players in the sports-league can make a significant impact to a fantasy team's performance. In an embodiment, as player's durability parameter is valued based on the average number of games not played due to injury during a season. One manner in which durability can be quantified is normalize the parameter from −1 to 1; with −1 representing the least durable players and 1 representing the most durable players. This normalized value is multiplied by (i) a user-defined weighting (percent of player value) for player durability (step 120 of FIG. 1) and (ii) the players point value (based on a compilation of other factors, including performance), to arrive at the final point value for this metric. This final value is added to the fantasy point value of each player, as determined from performance parameter values from past performances. The result of this algorithm is to increase, or reward, the fantasy point value of players that are less likely to get injured and decrease, or penalize, the fantasy point value of players that are more likely to get injured. When configuring this metric, users are able to select from (i) reward and penalize players based on this metric, (ii) only reward players based on this metric (this rewards players with a normalized value greater than zero), or (iii) only penalize players based on this metric (this penalizes players with a normalized value less than zero). A durability parameter value may be considered in aggregate for all of the season, or be considered a factor for a specific portion of the season. For example, if the durability parameter predicts a likelihood of injury, the user of the game simulation may elect to (i) consider the parameter value in aggregate for the entire season, and/or (ii) consider the parameter value for only a portion of the season where the player is more likely to be injured (such as at the end of the season). Therefore, if the player is injured in the second half of a season, his performance in the first half of the season (or conversely in the second half of the season) disproportionately impacts his aggregate fantasy point value for the entire season.

A consistency parameter may be defined based on a consistency measurement of the player. A value of a consistency parameter may predict how constant a player's performance in a sports league will vary from game to game. Depending on the manner in which a fantasy league, for example, calculates player valuations, consistency may determine when one player's overall or aggregate parameter values or not a true indication of the player's valuation to a particular fantasy team. In an embodiment, a player's consistency is defined as being based on the standard deviation of their performances over the span of their professional career. These standard deviations are then normalized from −1 to 1; with −1 representing the least consistent players and 1 representing the most consistent players. This normalized value is multiplied by (i) a user-defined weighting (percent of player value) for player consistency (step 120) and (ii) the players fantasy point value, to arrive at the final value for this metric. This final value is added to the fantasy point value for each player (step 130). The result of this algorithm is to increase, or reward, the fantasy point value of players that are more consistent with their performance and decrease, or penalize, the fantasy point value of players that are less consistent with their performance. A user may enter a negative number for the weighting for player consistency in which case players would be rewarded for inconsistent performance and penalized for consistent performance. When configuring this metric users are able to select from (i) reward and penalize players based on this metric, (ii) only reward players based on this metric (this rewards players with a normalized value greater than zero), or (iii) only penalize players based on this metric (this penalizes players with a normalized value less than zero).

Another parameter may correspond to a strength of opponents defenses. Such a parameter may be applied to offensive football players, such as the Quarterback, Running Back and Wide Receiver. Each player's team may have a schedule that is accessible to the fantasy league member. The schedule for the team of a particular offensive player may be evaluated to determine the Strength of Opponents Defenses for a particular game or set of games. Offensive players typically perform better against weaker defenses and worse against stronger defenses. The Strength of Opponents Defenses parameter enables a user to easily account for this potential variation in performance. The Strength of Opponents Defenses parameter may be determined for individual games or on an aggregate basis for a given set of games. According to one implementation, the Strength of Opponents Defenses can be determined for (i) all weeks of the season (can be configured to include or exclude week 17), (ii) the weeks of the fantasy leagues playoffs (can be configured to include any combination of weeks including week 13 and beyond), and (iii) the first five games of the season (this is not configured). The time period used may be based on the user's wishes, or on rules of the simulation.

All Game Scenario: The total yards-against of each team defense an offensive player plays against during each week of the fantasy football season is aggregated for each player. It should be noted that there are many metrics to quantify the strength of opponents. In this context, for example, other metrics for quantifying the strength of opponents include points scored against, passing yards thrown against, and rushing yards gained against. In one embodiment, the aggregate is based on data from one or more previous years, for each team involved. In another embodiment, the aggregate yards-against number is determined for each team on an ongoing basis for a current season of the football league. According to one embodiment, the aggregated values are then normalized from −1 to 1; with −1 representing the best grouping of opposing defenses (least aggregate yards against) and 1 representing the worst grouping of opposing defenses (most aggregated yards against). This normalized value may be multiplied by (i) a user-defined weighting (percent of player value) for a season segment (see FIG. 2) and (ii) the player's fantasy point value as determined by performance parameters and other valuations. The final value may be added to the fantasy point value to derive a new number. The result of such an algorithm is to recognize (i) additional value for offensive players that play against poor defenses during a season segment, (ii) a decrease in value for offensive players that play against good defenses during this season segment. A user may adjust the weight of this parameter favorably or unfavorably based on other considerations. This particular parameter may be configured by a user in one of the following ways: (i) reward and penalize players based on this metric, (ii) only reward players based on this metric (this rewards players with a normalized value greater than zero), or (iii) only penalize players based on this metric (this penalizes players with a normalized value less than zero).

Playoff Game Scenario: The total yards-against (or an alternative metric) of each team defense an offensive player plays against during each week of the fantasy football playoffs is aggregated for each player. The aggregated number may be based on the current fantasy football season (e.g. the first 12 games of the year). The aggregated values may then be handled in the manner described with the previous scenario—that is they may be normalized from −1 to 1; with −1 representing the best grouping of opposing defenses (least aggregate yards-against) and 1 representing the worst grouping of opposing defenses (most aggregated yards-against). Similar to the previous scenario, the normalized value is multiplied by (i) a user-defined weighting (percent of player value) for this season segment (such as described in the following step and with FIG. 2) and (ii) the player's fantasy value from the regular fantasy league season. The result is the final value metric, which can be used to reward and/or penalize players, as described with the previous scenario.

Season Segment Scenario: Due to strategy or other considerations, a user may decide to determine the parameters for certain segments of the overall season. For example, the user may decide to use the first five weeks of the football season to develop a fantasy player for a trade with another player. In such a scenario, the Strength of Opponents Defenses parameter may be determined for the teams of select players in order to identify players that are likely to have strong performances in that season segment.

Another parameter may correspond to strength of opponents offenses. In, for example, the context of football, this parameter may be used to adjust the fantasy point value for defensive players and defensive teams based on the strength of their opponents offenses that they play against during certain segments of the season. Defensive players and team defenses typically perform better against weaker offenses and worse against stronger offenses. These metrics enable users to easily account for this potential variation in performance. The season segments include (i) all weeks of the season (can be configured to include or exclude week 17), (ii) the weeks of the fantasy leagues playoffs (can be configured to include any combination of weeks including week 13 and beyond), and (iii) the first five games of the season (this is not configured). This parameter may be used similar to Strength of Opponents Defenses, described above, for the different segments or portions of a season.

Player Valuation Module

Figure 3:
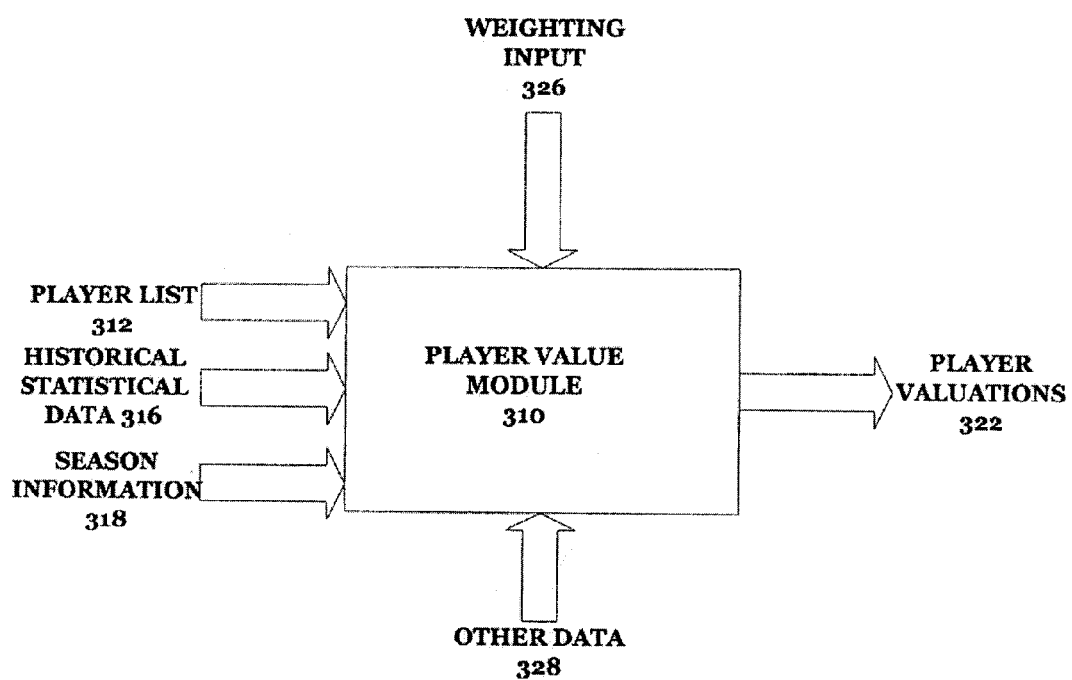
FIG. 3 illustrates a player valuation module for determining player values in a fantasy league, according to an embodiment.

One or more embodiments described herein may be implemented in the form of a module or program. The module may be accessible to users over a network, or alternatively in the form of a client application, so as to serve as a tool to facilitate the participants in the fantasy league. FIG. 3 illustrates a player valuation 310 module for determining player values in a fantasy league. In an embodiment, the player valuation module 310 may operate on one or more computer systems, and includes instructions executable by one or more processors.

The player valuation module 310 may process different types of data and information, combined with user-input, in order to determine a set of player valuations 322. The player valuations 322 may be made available to all users. However, the player valuations 322 may be configured for individual users, so that different users of the module receive different player valuations. Alternatively, player valuation module 310 may be executed by users individually, so that the payer valuations 322 are made available only to the users who use the module.

In an embodiment, player valuation module 310 receives a player list 312. The player list 312 may correspond to a complete or partial list of all players in a particular sports league at a particular time or time period. For example, the player list 312 may correspond to a list of players on each team in the NFL after the preseason is over and all of the teams have been set. The player valuation module 310 may process historical statistical data 316 on past performances of individuals in the player list 312. For a quarterback in football, for example, the historical statistical data 316 may include anyone or more of the following: quarterback rating, passing yardage, completion rate, yards-per-attempt, interceptions thrown, and touchdowns thrown. The historical statistical data 316 may also include data that is not specific to a particular player. For example, the won-loss record of each team, or aggregate statistics on teams as a whole, may be compiled in order to cross-reference player specific data with the respective player's team data.

In an embodiment, player valuation module 310 also receives future upcoming season information 318 for determining values of forward looking event specific parameters. In an embodiment, this type of data includes data for defining and valuing dynamic player values. This type of data includes, for example, the schedules of the teams for each player that is in player list 312. The historical statistical data 316 and the season information 318 may be gathered from information resources, including libraries or databases. For example, player valuation module 310 may operate on a terminal that accesses a library, database, or service over a network in order to gain the historical statistical data 316 and season information 318. Alternatively, some or all of the data and information may be received manually, from an operator of the fantasy league, an operator of the player valuation module 310, or from a user in the fantasy league.

According to an embodiment, player valuation module 310 also receives configuration input from user(s) of the fantasy league. An example of configuration input includes weighting input 326 that weights how different items in the historical statistical data 316 and the future information 318 should be valued with respect to one another. In an embodiment, the player valuation module uses the data and information in a manner described with embodiments of either FIG. 1 or FIG. 2. Thus, values parameters reflecting performance of a player and forward-looking events are determined based on the data and information. Specific examples of what can be determined for a particular player in the sports league include performance parameters, schedules, and metrics such as strength of schedule, durability and consistency. The weighting input 326 may determine what parameters a user thinks is important for a particular player or set of players, and how much some parameters should be valued over others. For example, the user may wish to weight durability to penalize the player value of a player because of their strength of schedule is strong. Specific examples of how weighting input 326 can be used are described with FIG. 1. Because each user in the fantasy league may have a different set of configuration input, one embodiment provides that the player valuation module 310 accepts input from different users, and maintains for each user in the fantasy league a different set of player valuations 322. Thus, different users in the sports league may have different player valuations for the same player in the sports league. Since each user of the fantasy league can rely on his own configuration input, the user is able to skew player valuations 322 based on his individual strategy. This compares favorably to existing fantasy sports leagues, which typically provide the same player valuation numbers to all the users, so that users make decisions while being presented the same set of data.

In addition to configuration data, player valuation module 310 may use other kinds of data 328. For example, weather information may be entered as input or accessed automatically by the player valuation module 310. Examples of weather information include historical weather data and forecasts. A user may decide to use weather information, or even to weight it. For example, the user may rely on weather information in deciding whether to select a player who is likely to play in inclement weather for a significant portion of the season. This type of data may consider how, for example, certain external factors may influence a particular class of players. For example, with respect to weather or environmental conditions, a Kicker or Running Back in football may have a higher metric, at least for this particular consideration, if that player plays indoor games in winter, or is located in a tropical climate. An offensive player on a football team with an indoor stadium and Astroturf may have a higher consideration than a player who is on a team that plays outdoors and in the Northeast of the country.

Draft Selection

In many fantasy leagues and other game simulations, the player formation stage serves as a foundation for the user's fantasy season. In most fantasy leagues, for example, the player formation stage is when the user forms the basis or core of his team. Even the subsequent ability or need for the user to make additional player acquisitions depends on the quality of the draft. For example, the user may reduce his need for having to waive non-performers in favor of free agents, or enhance his ability to make a trade for another player.

As previously mentioned, the team formation stage is called a draft in many fantasy leagues. An embodiment such as described in this section may have particular relevance to fantasy leagues in which the draft is conducted round by round, with each round having a particular draft order determined by rules of that fantasy league. A fantasy league generally consists of a number of teams in the neighborhood of 8-20 (although it is possible to have more or fewer). In more sophisticated leagues, each team gets one pick in a particular draft round. The order of selection in each draft round is determined by the fantasy league rules. A common way to conduct a draft is to randomly select the first order, then reverse that order for the next round, and then reverse it back for the third round until all the player positions in each team have been selected. For example, Table-1 is one common example of how a draft order may be carried through several rounds:

TABLE 1

| | Snake Draft Rule | | | |
|---|---|---|---|---|
| TEAM ID | $1^{ST}$ ROUND | $2^{ND}$ ROUND | $3^{RD}$ ROUND | $4^{TH}$ ROUND |
| A | 1 | 6 (12) | 1 (13) | 6 (24) |
| B | 2 | 5 (11) | 2 (14) | 5 (23) |
| C | 3 | 4 (10) | 3 (15) | 4 (22) |
| D | 4 | 3 (9) | 4 (16) | 3 (21) |
| E | 5 | 2 (8) | 5 (17) | 2 (20) |
| F | 6 | 1 (7) | 6 (18) | 1 (19) |

Table 1 illustrates the snake draft rule where the player who has the first pick in the first round gets the last pick in the last round. Numbers inside the parenthesis designate the overall draft pick. Numerous variations to this basic scheme are possible. For example, the second and third rounds may have the same draft order.

Figure 4:
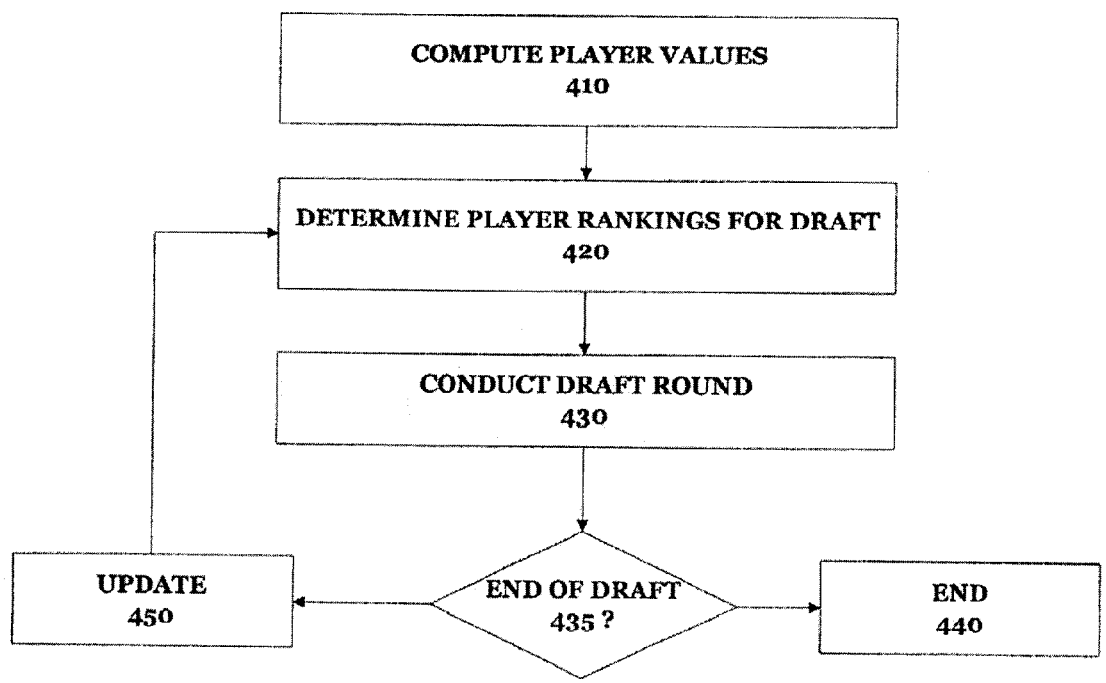
FIG. 4 illustrates a method in which players may be valued to facilitate a user's selection in a particular draft round, according to an embodiment.

FIG. 4 illustrates a method in which players may be valued to facilitate a user's selection in a particular draft round. A method such as described by FIG. 4 may be performed by anyone or more of the following: (i) a service that conducts the fantasy league, (ii) a third-party service or tool that is available to all users of the fantasy league, or (iii) a personal tool used by one or more users in the league independently of other users.

Step 410 provides that player values are calculated for each player in the real-life sports league, or at least each player that is likely to be selected. The player value calculations may be based on different parameters, and in particular, performance parameters.

Figure 5:
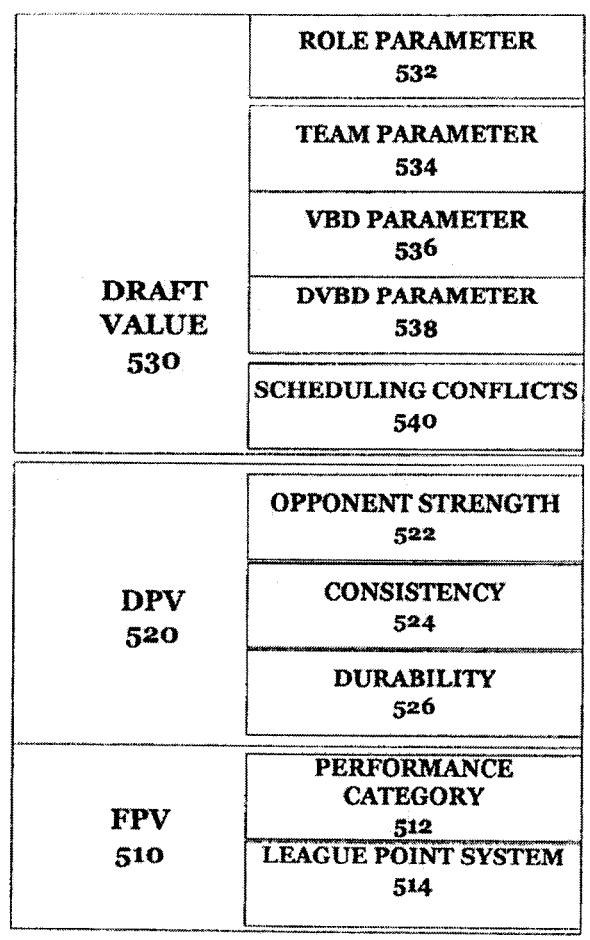
FIG. 5 illustrates various parameters that can be used to value a player at the draft stage of a fantasy league, according to an embodiment.

In step 420, player rankings are formed that consider select number of available players. An embodiment such as described in FIG. 5 provides that player rankings at the draft stage consider various parameters and metrics, with a specific category of parameters that are based on draft considerations. The player rankings may be sorted by player position. For example, quarterbacks may be ranked based on their respective overall valuations. According to an embodiment, there may be two or more components to the overall player valuation. One component reflects the player's overall value, absent any draft consideration (fantasy point value and dynamic point value in FIG. 5). Another component reflects draft considerations (draft value points in FIG. 5). With respect to the first component, the overall player valuations may be determined in a manner consistent with embodiments described with FIGS. 1-3. Alternatively, player valuations may be determined using more traditional fantasy point value systems. With respect to draft considerations, an embodiment provides that players valuations take into account whether the player selection will maximize the fantasy teams overall performance as compared to other teams in the fantasy league. This decision does not necessarily correspond to selecting the player with the highest value or player ranking. Rather, decisions may be impacted by one or more factors such as (i) comparative value of players available as opposed to other users for use in the fantasy league, (ii) the ability to draft quality players in subsequent draft rounds impact the decision on draft picks. (iii) schedule conflicts amongst players, and (iv) sports team conflicts. These factors are reviewed in greater detail with FIG. 5. After each draft pick, or round, these factors will also change. Specifically, the factors will change because the pool of available players changes. In many cases, so does the draft order.

In step 430, a draft round is conducted. In the round, each user in the league may make a selection. In step 435, a determination is made as to whether the draft is over. Once the draft is over, the method is completed in step 440. If additional rounds remain, then step 450 provides that the parameters categorized as draft considerations are updated. In an embodiment, the update considers the following for a particular fantasy team: (i) the pool of available players after one round in the draft, (ii) the players that are already selected for that team; (iii) differences amongst available players; and (iv) changes in the draft order (see Table 1). The method then returns to step 420.

FIG. 5 is a block diagram that illustrates how players may be valued and selected in a player draft of a fantasy league, under an embodiment. In particular, FIG. 5 illustrates draft considerations which may be valued as parameters in evaluating what player should be selected with a particular draft pick. In a draft, player valuation may be based on three general categories: (i) a first category 510 for fantasy points, which uses expected performance parameter values to value a player; (ii) a second category 520 of dynamic player value parameters, based on future, game-specific considerations; and (iii) a third category 530 of draft value considerations. Each category may comprise different parameters. User-specified weight parameters may affect how categories, individual components and/or parameters of individual categories are valued in relation to one another. An embodiment such as shown by FIG. 5 enables a user to make a draft pick using considerations provided in all three categories. This allows the user to properly consider the value of a candidate draft pick based on past performance of that player, game-specific considerations in the upcoming season, and considerations from the draft itself.

The first category 510 of fantasy points may correspond to standard point valuations given to players based on expected performances. An overall valuation number or indication may be formed based on one or more parameters of expected performance. In one embodiment, components of this category include categories 512 of performance parameter values and a fantasy league point system 514.

The second category 520 includes dynamic player value parameters such as described with FIGS. 1 and 2. These values indicate the value a player will bring to a fantasy team when games that the player is scheduled to play in are considered individually, such as parameters of opponent strength 522, consistency 524, and durability 526.

The third category 530 includes parameters of draft considerations. One draft parameter of the player role 532 pertains to whether a starting position has been completely filled. In fantasy leagues, the performance of a backup player is usually devalued in relation to a starter. This is the case even if the backup player is actually a starter in the sports league. This parameter can be used to automatically inform the user when a position on a fantasy team has been filled. The result is that the user can choose players who will be starters, and can value a starter over a backup, regardless of position. In many fantasy leagues, the draft is conducted quickly, and each team consists of one participants. A tool that tracks when starter positions have been filled on a team has value in that it affords the user an opportunity to track information that affects basic player-selection decisions.

Another draft parameter that can be tracked and maintained as a draft progresses is a team parameter 534. The team parameter 534 may be valued to track a degree to which available players are on the same sports teams. If a fantasy team has too many players on one sports team, the user may be taking an unplanned risk. For example, an unexpected bad season by that team may detrimentally affect the performance of all players on that team.

Both of the role parameter 532 and the team parameter 534 draft parameters provide examples of instances when, as the draft progresses, the user can devalue a particular player because of that user's previous draft pick. For example, in football, once the fantasy user selects a first quarterback, a system such as described automatically devalues remaining quarterbacks, because the other quarterbacks would serve only backup roles on the fantasy team (and by most fantasy rules, fantasy points from backups are not worth as much). As the draft progresses and the teams fill out, the ability to automatically monitor this aspect becomes valuable, particularly when users have limited time to make a draft pick. As another example, once a player selects a set number of players from one team, or from an offense or defense of a team, other players that are still in the draft pool may be devalued for that player. Thus, for example, the fantasy points associated or displayed along with a player may be reduced as a result of the user having previously selected a certain number of players from the same team.

Other types of draft parameters are contemplated. In particular, a VBD parameter 536 and DVBD parameter 538 associate an opportunity cost with a particular draft selection. The VBD parameter 536 may be based on a VBD methodology for each player position. For example, for a draft round consisting of six picks, an embodiment provides that all players are ranked by position. Each of the top five players in each position are compared to the sixth best player in that position. This lets user's determine a cost associated with a particular pick. For example, if the players at a particular round of the draft have parity, while at another position there is considerable variance in terms of value, a parameter determined from the VBD methodology may conclude that there is too much cost associated with picking up a player in the first position where there is parity. The correct decision may be that even though the available player at the second position is not as valuable in terms of points relative to the first player, the second player is the better draft pick because of the drop-off in quality from one player to the next at a particular position.

TABLE 2

VBD tally for Quarterback position in fantasy football.

| $VBD_{QB1}$ | $VBD_{QB2}$ | $VBD_{QB3}$ | $VBD_{QB4}$ |
|---|---|---|---|
| $PV_{QB1}-PV_{QBn}$ | $PV_{QB2}-PV_{QBn}$ | $PV_{QB3}-PV_{QBn}$ | $PV_{QB4}-PV_{QBn}$ |

TABLE 3

VBD tally for Running Back position in fantasy football.

| $VBD_{RB1}$ | $VBD_{RB2}$ | $VBD_{RB3}$ | $VBD_{RB4}$ |
|---|---|---|---|
| $PV_{RB1}-PV_{RBn}$ | $PV_{RB2}-PV_{RBn}$ | $PV_{RB3}-PV_{RBn}$ | $PV_{RB4}-PV_{Rn}$ |

The Table-2 and Table-3 each illustrates one manner in which VBD values may be used, according to an embodiment. QBn and RBn may refer to a Quarterback and Running Back player, each selected for comparison purposes with other players of the same position. For example, an overall point value of a tenth best Quarterback may be QBn. The rankings of the Quarterback position may follow: QB1, QB2, QB3 . . . QBn; while the rankings of the Running Back position may follow: RB1, RB2, RB3 . . . RBn. The following example illustrates use of the VBD parameter. In the third round of a fantasy draft, a user may have a choice between the third best Running Back (RB3) and the second best Quarterback (QB2). If the VBD number between QB2, QB3 or QB4 is about the same, while there is a more drastic drop-off in the VBD value between RB2 and RB3, the user may elect RB3 as the better draft choice, even if the point value (or alternatively the estimated points that a particular player will bring to a team) for QB2 is better.

According to an embodiment, VBD parameter 536 values may be maintained by a draft player module that can be operated as a tool by one or more participants of a fantasy league. In addition, an embodiment provides the VBD methodology may be configured by a particular user on the-fly. For example, the user may make a new selection on who the reference player is. An embodiment also provides that the values that VBD determinations are based on are user-configurable, with selection, omission and or weighting of certain parameters such as described in FIGS. 1-3.

Embodiments of the invention also employ the DVBD methodology to maintain the DVBD parameter 538. As described previously, DVBD methodology is similar to VBD methodology, but the basis of comparison amongst players is two consecutively ranked players having the same position. Specifically, a tool or system may maintain DVBD values for each player available in the draft pool. As with VBD parameter 536, the DVBD parameter 538 is intended to determine a cost associated with a particular pick. However, as explained earlier, the DVBD differs from the VBD in that it compares players that are consecutively ranked at the same position.

TABLE 4

A DVBD matrix.

| Position | $DVBD_1$ | $DVBD_2$ | $DVBD_{n+1}$ | SDEV |
|---|---|---|---|---|
| QB | $PV_{QB1}-PV_{QB2}$ | $PV_{QB2}-PV_{QB3}$ | $PV_{QBn+1}-PV_{QBn}$ | $SD_{QB}$ |
| RB | $PV_{RB1}-PV_{RB2}$ | $PV_{RB2}-PV_{RB3}$ | $PV_{RBn+1}-PV_{RBn}$ | $SD_{RB}$ |
| WR | $PV_{WR1}-PV_{WR2}$ | $PV_{WR2}-PV_{WR3}$ | $PV_{WRn+1}-PV_{WRn}$ | $SD_{WR}$ |
| TE | $PV_{TE1}-PV_{TE2}$ | $PV_{TE2}-PV_{TE3}$ | $PV_{TEn+1}-PV_{Ten}$ | $SD_{TE}$ |

As shown by Table-4, the DVBD parameters may be maintained as a matrix that is automatically updated after each draft pick. Furthermore, the value of the DVBD parameter 538 may be different for each user of the fantasy league, particularly when users have the option to weight parameters one way or the other. For example, if different users have different weighting parameters, point values for different positions may be different, affecting all columns in the table. An embodiment such as described may provide a data structure such as illustrated by Table-4 to allow users in a fantasy league to plan and strategize draft picks. One draft strategy may be to select the best player at the particular position where the Standard Deviation is the highest. This means that there are steeper drop-offs in terms of the point value amongst players in the same position. As a result, the players who have the next draft picks may lose more in terms of point value from a player at a particular position. The net result is that the DVBD helps users devalue for draft purposes players at the same position where there is parity.

In addition, third category 530 of draft considerations may include a parameter 540 that quantifies scheduling conflicts. The opponent schedule for each player may be evaluated to determine if too many players on the same team have the same days off. In particular, if two players are starters and/or have the same position, their absence in one game may be more detrimental to a fantasy team than if the players were absent on different teams. In particular, NFL teams have one or two bye-weeks per season. A fantasy team may want to avoid using two starting running backs having the same bye-week. In that case, the cost of not having a starter on the bye-week may exceed the cost of losing one of two starters over two games.

Various other metrics may be tracked for purpose of determining draft selections and draft values. For example, one embodiment considers when a player will make a subsequent draft selection. In a round of 10 draft picks, if a player has to wait 10 picks before the next pick, the metric may be identified to the user. It is possible for certain metrics to reflect a long wait until the next round. For example, in Table-4, likely players to be selected by other users after the player's turn may be highlighted. However, if the player has consecutive picks (such as the $10^{th}$ and $11^{th}$ in a round of 10), no such indication may be needed.

The various categories and parameters described in FIG. 5 may be provided in the form of one or more modules or programs that users of a fantasy league can use in order to improve their performance in a fantasy league or other game simulation. For example, a module such as described in FIG. 6 may be made available to users over a network. Alternatively, the module may be made available as a download or client application. For example, a user may carry a draft module that incorporates features described in FIG. 5 on a personal digital assistant (PDA) or laptop into a live simulated draft of a fantasy league.

Figure 6:
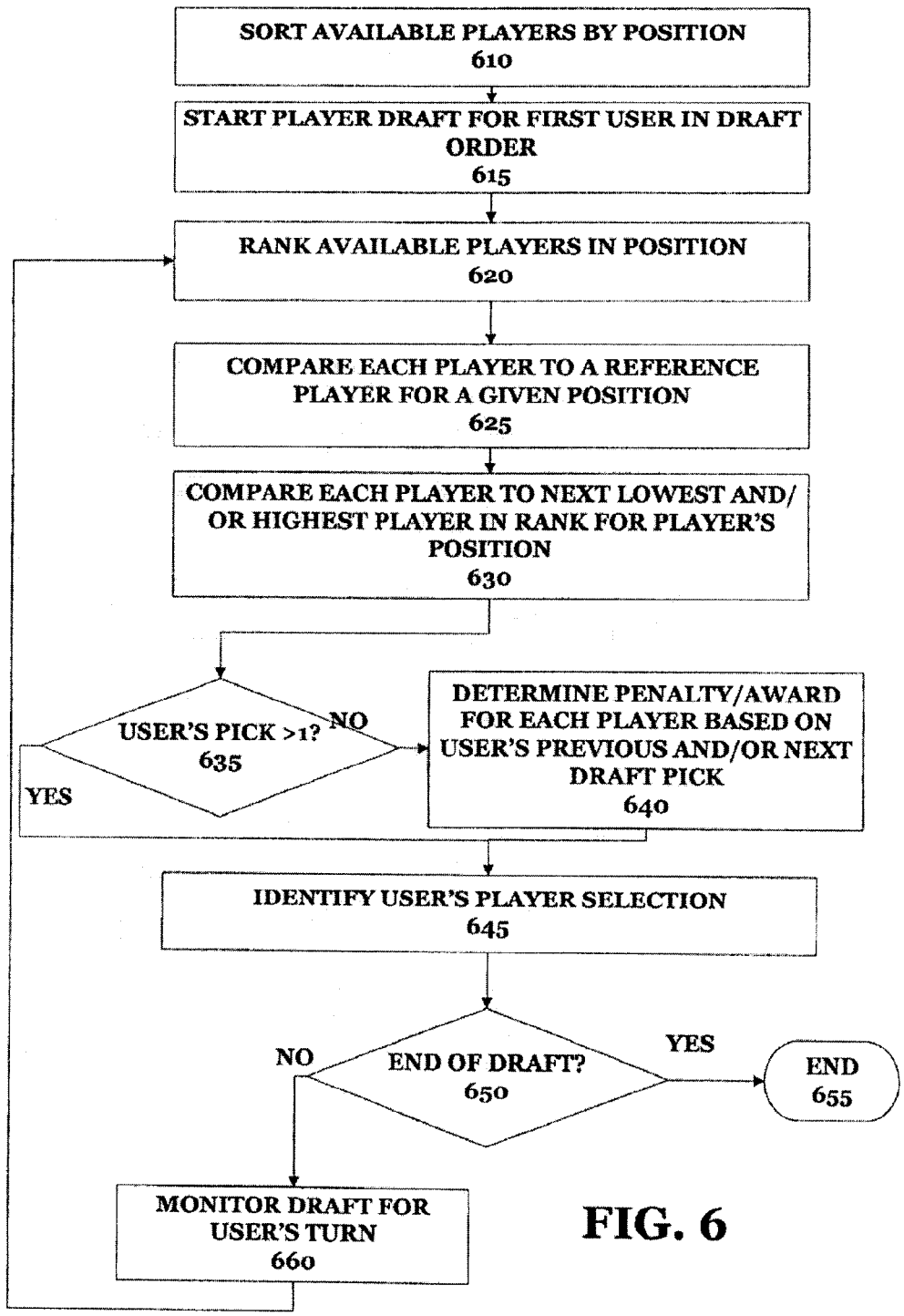
FIG. 6 illustrates a method for evaluating various draft considerations in the course of a fantasy league draft, according to an embodiment.

FIG. 6 illustrates a method for evaluating various draft considerations in the course of a fantasy league draft. For purpose of illustration, a method of FIG. 6 is described in the context of the sport of football, and in particular, the NFL.

Step 610 provides that players are sorted by position. For example, this includes listing players by offensive position (Quarterback, Running Back etc.), defensive position (Linebacker, Safety), and special teams (Kicker).

Step 615, the player draft is started. The order of the draft may be based on any factor, such as randomness. Under typical fantasy league rules, one team is given one pick per round.

In step 620, players are ranked by position. In an embodiment, the ranking is primarily based on parameters in the first category 510, although embodiments include adjusting valuations based on user-weighting and dynamic parameters (such as opponent strength). Draft considerations from the third category 530 may also be considered in valuing a player.

Step 625 provides that a grouping of players of a given ranking (e.g. ranked 1-10) are compared to a common reference player. This step may correspond to determining the VBD parameter 536. For example, the best 10 players of a particular position may be compared to the player ranked $20^{th}$.

Step 630 provides that players are compared in position to other ranked players. In particular, players are compared to the next lowest player in the ranking determined in step 620.

In step 635, a determination is made as to whether a user's pick is that user's first pick. If there has been a previous pick, then step 640 provides that a penalty/award value is associated with each player based on the user's previous draft pick. These may correspond to a value of role parameter 532 (indicating starting positions of a particular player in the draft pool have been filled) and team parameter 534 (indicating that a fantasy team is overly weighed with players from one sports team).

If the determination in step 635 is that it is the first draft choice of the user, or following step 640, step 645 identifies the user's draft selection. Step 650 determines whether the pick was the last of the draft has ended, in which case the method ends in step 655. If the draft is ongoing, step 660 provides that the next picks of the draft are monitored until the particular user is up again in the draft. Then the method is repeated, from step 620.

Network Architecture for Implementation of Game Simulation

A fantasy league may be implemented through numerous mediums. An important aspect of a fantasy league is a centralized location where fantasy team, scores and other information is maintained. Also, it is important for users in the fantasy league to communicate with one another or at least with the service on which the fantasy league is being run. For this reason, fantasy leagues often involve use of networks, such as the Internet.

Figure 7:
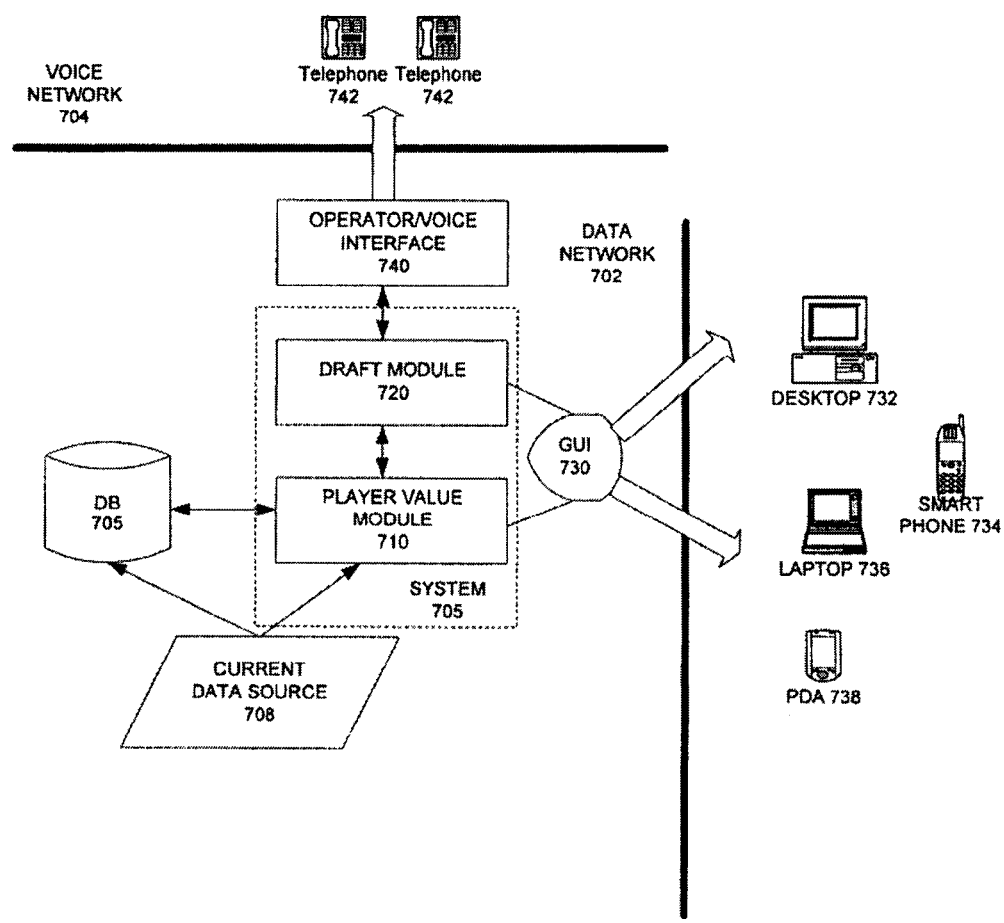
FIG. 7 illustrates a network architecture for implementation of embodiments described herein with a fantasy league.

FIG. 7 illustrates a network architecture for implementation of embodiments described herein with a fantasy league, according to an embodiment of the invention. Embodiments of the invention include a fantasy sports service that facilitates users of a fantasy sports league in strategy and making decisions. Components of the service 700 include a player value module 710 and a draft module 720. The player value module 710 may include valuation methodologies that take into account dynamic player value parameters, such as described in FIGS. 1-3. These parameters include, for example, opponent strength, player durability, and player consistency. The draft module 720 may include methodologies described in FIGS. 4-6, which facilitate draft selections for a fantasy league user. The draft module 720 and the player value module 710 may derive information from a database 705 or other libraries. The database 705 be populated with data from various data sources 708 that maintain sports league information, including scheduling information, and player performance information.

Various network devices may communicate with service 700 over a data network 702. Examples of network devices include desktop computers 732, laptop computers 734, smart phones 736, and wireless devices (such as personal digital assistants) 738. The service 700 may be suited for portable devices so that fantasy users may communicate with service 700 even when the fantasy league they participate in calls for in-person draft sessions. It is also possible for an operator/voice interface 740 to provide an interface between service 700 and callers using phones 742 over the voice network 704. The network devices 732-738 may communicate with the service 700 via a graphical user-interface 730.

Alternatives for making service 700 available to users exist. In one embodiment, a user may download components and data for service 700 using a laptop or PDA and carry the service and data to a fantasy league participation forum. Other stand-alone scenarios implementations may be provided. In addition, an embodiment may be a combined stand-alone and network operated combination. For example, the user may be able to update data (e.g. the latest statistics or formulas) for an otherwise stand-alone application that corresponds to an embodiment described herein. The service 700 may also be integrated into another service form which the fantasy league operates. For example, an Internet fantasy league may offer service 700 as an analysis tool, at additional cost.

Drafting Players Using Draft Position Information

One or more embodiments provide for assisting a user-participant in making a player selection during a fantasy league draft (or other team formation process of a simulation league). One embodiment provides that, prior to a user-participant making a player selection at a given draft position during a fantasy league draft, a programmatic determination is made as to a likelihood that a particular player will be available for selection in one or more subsequent draft positions. The draft positions may be ones assigned to a particular user-participant, or any draft position a user-participant wants to consider. In one embodiment, the determination is then communicated to the user-participant prior to the user-participant making the payer selection in the given draft position.

In embodiments described below, the user-participant corresponds to the fantasy league player or team owner. A player, as provided with embodiments described below, is a player in a sports league, and whose performance in the sporting events of that league are valued by a fantasy league.

Additionally, with embodiments described below, a draft defines a designated order where individual user-participants can make selections of players. A draft position (sometimes referred to as a draft pick) is a position in the designated order.

In another embodiment, the user-participant is programmatically assisted in making a player selection by being provided information representing an aggregate determination of a draft position of one or more players. In one embodiment, the aggregate determination is based on selections of players made in other fantasy league drafts. For example, previous fantasy league drafts conducted days before may be analyzed to determine an average draft position for a given player.

One or more embodiments provide that in a team formation stage (i.e. the player draft), a user-participant is provided information indicating the likelihood that a particular player will be available for selection at a subsequent time. In one embodiment, the user-participant is provided, prior to making a current player selection or draft pick, information indicating a likelihood of whether a given player will be available at the user-participant's next opportunity to select a player.

The following example is illustrative. During a player draft of a fantasy league, the user-participant may have multiple draft picks, where each draft pick provides an opportunity for that user-participant to select a player from an available player pool. The player may have one draft pick per round, unless he makes a trade for more draft picks. Prior to making his first round pick, the player may be provided predictive information indicating one of his desired players will be available in the second round.

Figure 8A:
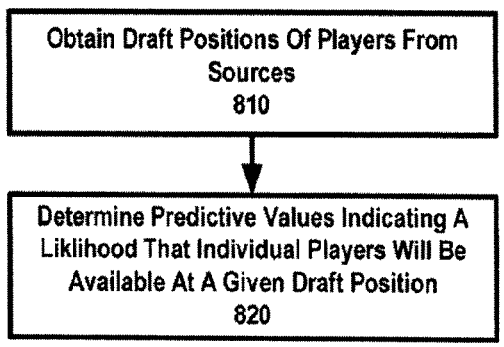
FIG. 8A illustrates an embodiment in which a user-participant is provided predictive draft position information, under an embodiment of the invention.

FIG. 8A illustrates an embodiment in which a user-participant is provided draft position information, under an embodiment of the invention. The draft position information may be predictive information, in that it may indicate whether a given player (when identified by name or player value or rank), or a class or group of players, will be available for selection at different draft positions. In one embodiment, the draft position information is determined from sources that include past player drafts in other fantasy leagues. In particular, the draft position information may be determined from past player drafts that occurred in the same season. The information may also weighted, in favor of, for example, more recent information. The player drafts that are used as a source of information may be provided from a common host, or be published information. Alternatively, individual user-participants may supply the information, or the information may be read from other leagues conducted by other hosts.

In step 820, the draft position information is used to determine a likelihood that a given player, or a class of players, will be available. As will be described, numerous implementations for utilizing the draft position information are contemplated. The information may be made available to user-participants individually, or alternatively, to all user-participants of a fantasy/simulation league at one time. The draft position information may be used to provide recommendations and information predictive of the available player pool at the time of a given user-participant's draft positions, or at the time of other draft positions. In the latter case, the draft position information can be used to assist a user-participant in determining whether to make a trade to change a player draft position assigned to that user-participant.

Figure 8B:
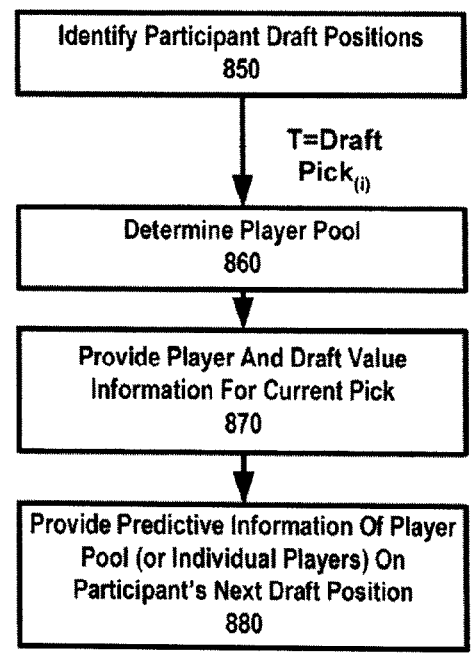
FIG. 8B illustrates a more detailed embodiment for enabling a user-participant of a fantasy or simulation league to make player selection decisions during a draft, using predictive draft position information, under one or more embodiments of the invention.

FIG. 8B illustrates a more detailed embodiment for enabling a user-participant of a fantasy or simulation league to make player selection decisions during a draft, using draft position information, under one or more embodiments of the invention.

In a step 850, the given user-participant's draft positions are identified. The user-participant may manually identify his or her draft positions, or the information may be determined programmatically from the service that conducts the draft.

Before a player selection (i.e. draft pick), one embodiment provides that in step 860, a pool of available players at that draft position is identified. For example, a method may start by tracking all players that can be drafted in a draft or team formation stage. With each player selection, the available player pool is updated. When the user-participant's turn arrives to make a player selection, the pool of players is known for that draft pick.

One embodiment provides that the player values, draft values, and combinations thereof, are determined for available player's at a given draft position. Recommendations or quantitative valuations as to what players should be selected by the user-participant at a given draft position may be made using techniques such as described with FIG. 1-FIG. 7. Step 870 may be optional, in that a programmatic guide or tool may be implemented to provide draft position information independent, or without use, of other information for recommending a player draft selection.

In a step 880, draft position information is provided for players or the available pool of players. The draft position information may be provided in various context to aid the user-participant in making a selection. For example, FIG. 10A, and FIG. 10B illustrate different implementations for how the draft position information may be used. In an implementation of FIG. 10A, the draft position information is provided independently of other information. In an implementation of FIG. 10B, the draft position information is combined with other values to aid the user in making a player selection. As described in, for example, step 810, various source of information may be used to obtain the draft position information (other drafts etc.). The draft position information may be integrated with the player an draft values, or provided separately.

An embodiment such as described with FIG. 8B enables a player to have updated information for assisting player selection at each draft pick. Thus, for example, the user-participant can decide whether to make a trade to have a desired draft position that is better or worst that another draft position originally assigned to him. For example, the user-participant may elect to make a trade because his most desired player will most likely not be available at his next opportunity to select a player.

Figure 9:
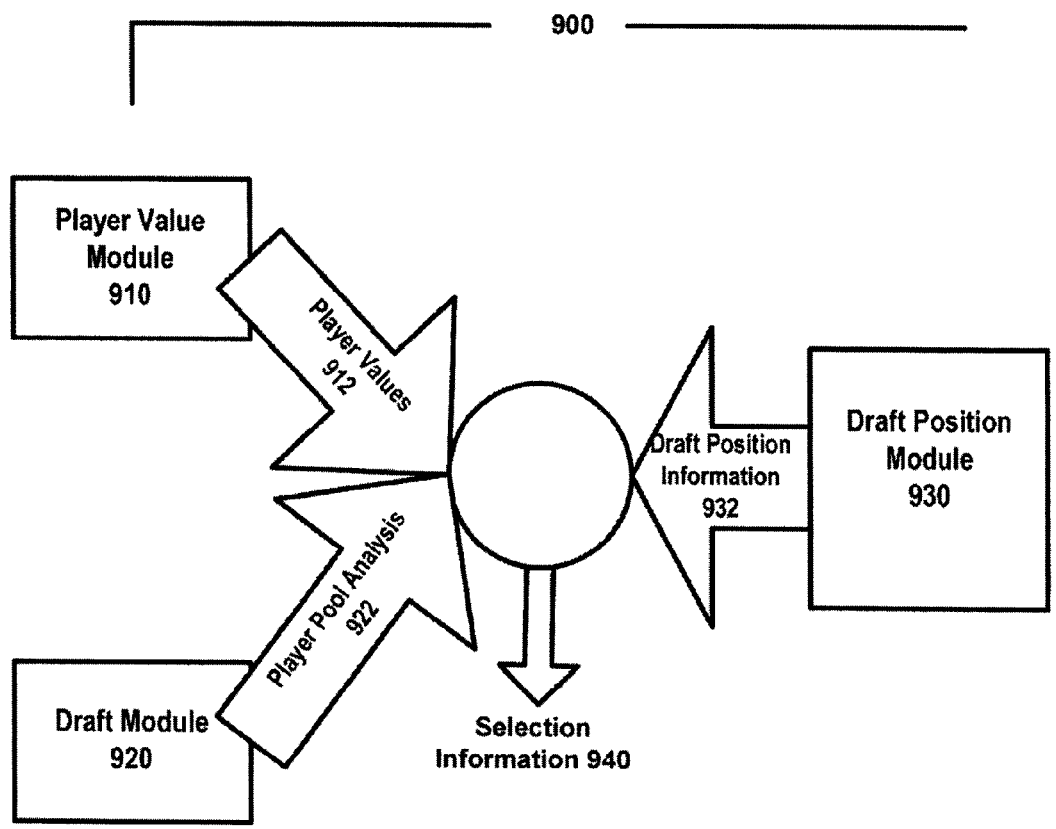
FIG. 9 illustrates an embodiment for a fantasy sports system that integrates various functionality and tools described herein, including the ability to provide draft position information for players in connection with other valuation parameters, under one or more embodiments of the invention.

FIG. 9 illustrates an embodiment for a fantasy sports system that integrates various functionality and tools described herein, including the ability to provide draft position information for players in connection with other valuation parameters, under one or more embodiments of the invention. A system 900 such as shown and described may be implemented as part of, for example, a service such as described with FIG. 7.

In an embodiment a system 900 includes a player value module 910, a draft value module 920, and a draft position module 930. The player value module 910 may provide valuation 912 of players, based on techniques such as described with other embodiments described herein. Further, as described with one or more embodiments, the draft value module 920 may enhance information provided about a player pool by comparing players (based on player values) with other available players in the same position, or with respect to a reference parameter or player. Such calculations provide the user-participant an opportunity to view consequences of drafting one player over another. Such draft value information 922 enables the user-participant to evaluate some consequences of player selections, particularly when players are of a common class or position. For example, in football, the draft value module 920 may determine that two quarterbacks are available and comparable in value, while a more measurable difference may exist between the two best players at a different position.

In an embodiment, the draft position module 930 enhances information provided by further providing draft position information 932. Selection information 940 may be provided, for purpose of recommending or aiding the user-participant in making a player selection, trade or other decision. The selection information 940 may present a compilation of the player valuations 912, draft value information 922, and draft position information 932. As described with an embodiment of FIG. 8A or FIG. 8B, the draft position information 932 may be predictive, in that past results or events on when a given player was selected is communicated to the user, and the user can infer or anticipate similar results will occur based in part on the events of the past fantasy league drafts. For example, as described with FIG. 10A and FIG. 10B, the information may be provided in the form of tables.

An embodiment such as described with FIG. 8A, FIG. 8B and FIG. 9 may be combined, or used to enhance, supplement or modify any of the embodiments described with FIG. 1-7 or elsewhere in this application. For example, the draft position information may be combined with parameters that evaluate or otherwise quantify parameters that include (i) a player's overall performance level, based on, for example, historical data; (ii) an estimation of a player's durability or consistency; (iii) the presence of a scheduling conflict with another player selected by the user-participant; and (v) strength of schedule for the player. The draft position information may also be combined with, or integrated to enhance, supplement or modify DVBD values, as described with, for example, an embodiment of FIG. 5.

FIG. 10A and FIG. 10B provide different implementations of how draft position information may be presented to a user, under one or more embodiments of the invention. In an embodiment, the draft position information is a predictive aid for assisting the user in making a player selection during a fantasy league draft.

In a presentation of FIG. 10A, a recommendation table 1010 is provided listing players by name. The recommendation table 1010 presents a list of players that can be optionally selected by a user-participant at a particular draft position or time. The recommendation table 1010 may be sorted based on different parameters. For example, in FIG. 10A, the recommendation table 1010 lists players by position (running back). One of the columns 1016 carries a value 1018 representing anticipated draft position ("ADP") information. Specifically, one embodiment provides that for each player in the available pool at the start may have associated with him (or her) an ADP value that is based on evaluation or observation of when that player was selected in other fantasy league drafts. As an example, a fantasy draft season may start with several early fantasy draft leagues, in anticipation of upcoming season of a corresponding spectator sport. The order of player selections may be observed or analyzed, and ADP values are determined for use in another subsequent fantasy draft league in the same season. As the fantasy draft season progresses with the numerous leagues (thousands), the ADP values are based on a greater number of data points.

In one embodiment, the ADP value 1018 conveys an indication as to where, in the order of all players of a given position (e.g. running back), each player of that position will be taken. Alternatively, the recommendation table 1010 may be sorted by other parameters, including player value or draft values, or a compilation thereof, as discussed with other embodiments.

FIG. 10B illustrates another recommendation table 1020 in which a set of players are listed and recommended based on a combination of draft position predictions and draft value determinations. As described with one or more embodiments, the draft value determination represents a player valuation (e.g. player value) as compared to the next highest player valuation of a player at the same position. From this general calculation, an embodiment shown by FIG. 10B supplements the information by making a determination as to the players that may or are likely to be selected between a given user-participant's current draft position and his next draft position.

Thus, for example, under one implementation, a program identifies at a given draft position, (i) a current pool of available players, (ii) the user-participant's next draft position, and (iii) a hypothetical or anticipated pool of available players at the user-participant's next draft position. In one embodiment, the anticipated pool may be determined from draft position information of other fantasy league drafts. Specifically, the ADP value of each player may be determined prior to the draft. If the user-participant's consecutive draft positions are known (e.g. $3^{rd}$ and $14^{th}$ selections in a draft), a programmatic means may determine which players have ADP values that indicate they will be taken before the $14^{th}$ pick. In this way, the available pool may be determined.

In an embodiment shown by FIG. 10B, for each player position, the program determines the highest valued player in the current pool (e.g. by player valuation determination of column 1022), and in the anticipated pool (e.g. player valuation determination of column 1024). The difference in player valuations of the two pools is then calculated (value of column 1022 minus value of column 1024). A predictive draft value loss is determined in column 1026. This value represents an opportunity cost or lost value of the user-participant in selecting the highest value player at a given position. For example, in a table of FIG. 10B, a program would recommend that the user-participant select the highest ranked wide receiver, even though the quarterback and defensive players that are available at that draft position have much higher player valuations. This recommendation predicts that if the user-participant omits selecting the highest rated player at one position (e.g. at quarterback or defensive), the user-participant will have with his next draft pick, a comparably valued player at each of those positions. But, using predictive draft position information to determine the valuation of the available pool at the user-participant's next pick, the recommendation is made for the user to select a lower valued wide receiver, as the wide receiver position holds the biggest predictive valuation drop-off between the user-participant's draft picks.

Conclusion

The foregoing description of various embodiments of the invention has been presented for purposes of illustration and description. It is not intended to limit the invention to the precise forms disclosed. Many modifications and equivalent arrangements will be apparent.

What I claim is:

1. A computer-implemented method for assisting a user-participant in making a player selection during a fantasy league draft, the method using one or more processors to perform steps comprising:
   prior to the user-participant making a player selection in the fantasy league draft, determining a subset of players from a set of available players based on (i) the subset of players completing a fantasy team of the user-participant, and (ii) a sum of the subset of player's estimated values being maximized;
   wherein determining the subset of players is further based on one or more constraints that are determined from (a) fantasy league rules, (b) the user-participant's anticipated draft position, and/or (c) the user-participant's draft preferences.

2. The method of claim 1, wherein the constraints based on the fantasy league rules comprise requirements on a draft position assigned to the user-participant.

3. The method of claim 1, wherein the constraints based on the fantasy league rules comprise requirements on a first draft selection reserved for the user-participant and a second draft selection reserved for another user-participant.

4. The method of claim 1, wherein the constraints based on the fantasy league rules comprise requirements on a total number of user-participants in the fantasy league.

5. The method of claim 1, wherein the constraints based on the fantasy league rules comprise requirements on a minimum number of players selected at a certain player position.

6. The method of claim 1, wherein the constraints based on the fantasy league rules comprise requirements on a maximum number of players selected at a certain player position.

7. The method of claim 1, wherein the constraints based on the user-participant's anticipated draft position include, given a set of draft opportunities, an estimate of a particular player will be available for selection by the user-participant at which one or more draft opportunities based on results from other similar fantasy league drafts.

8. The method of claim 1, wherein a player's estimated value is based on a predicted performance of players in a professional sports league for all games during a sport season.

9. The method of claim 1, wherein a player's estimated value is based on a predicted performance of players in a professional sports league for a set or a subset of games played on a single day during a sport season.

10. The method of claim 1, wherein a player's estimated value is based on a predicted performance of players in a professional sports league for a set or a subset of games played during a consecutive 7-day span in which players participate in one or more games during a sport season.

11. The method of claim 1, wherein the user-participant's draft preferences comprise an input from the user-participant to adjust a respective player's estimated value based at least in part on a probabilistic determination of the respective player being injured in a sport season.

12. The method of claim 1, wherein the user-participant's draft preferences comprise an input from the user-participant to adjust a respective player's estimated value based at least in part on a measurement of the respective player's consistency in one or more past sport seasons.

13. The method of claim 1, wherein the user-participant's draft preferences comprise an input from the user-participant to adjust a respective player's estimated value based at least in part on an evaluation of an opponent player of the respective player in each of one or more individual games of a sport season.

14. The method of claim 13, wherein the respective player is offensive, and wherein the step of determining the subset of players is further based on an evaluation of the opponent player's defense for one or more games of the sport season.

15. The method of claim 13, wherein the respective player is defensive, and wherein the step of determining the subset of player is further based on an evaluation of the opponent player's offense for one or more games of the sport season.

16. The method of claim 1, wherein the user-participant's draft preferences comprise an input from the user to adjust a respective player's estimated value, the input comprising a reduction of the respective player's estimated value if the user-participant has previously selected another player who is on the same team with the respective player.

17. The method of claim 1, wherein the user-participant's draft preferences comprise an input from the user to adjust a respective player's estimated value, the input comprising a reduction of the respective player's estimated value if the user-participant has previously selected another player who has a scheduling conflict with the respective player.

18. The method of claim 17, wherein the respective player and the another player are in a professional American football league, and wherein the scheduling conflict corresponds to a team of the respective player and a team of the another player each having a same bye week.

19. The method of claim 1, wherein the user-participant's draft preferences comprise an input from the user to include a certain player or set of players in the set of available players.

20. The method of claim 1, wherein the user-participant's draft preferences comprise an input from the user to exclude a certain player or set of players from the set of available players.

\* \* \* \* \*